May 13, 1952  M. W. MacAFEE  2,596,575
OIL FIELD WASH TANK
Filed Oct. 22, 1949  3 Sheets-Sheet 1
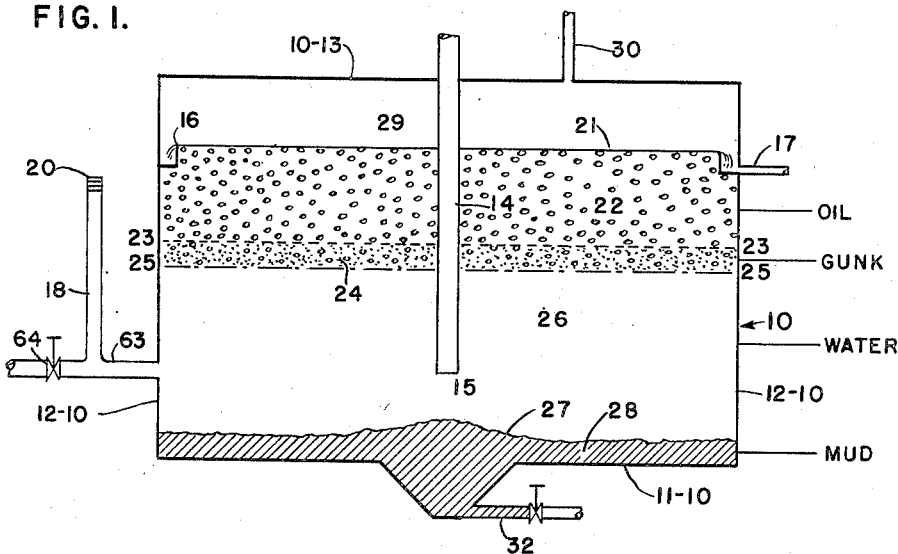
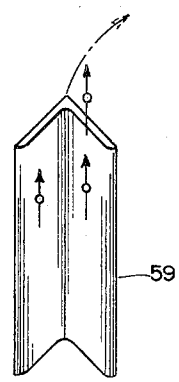
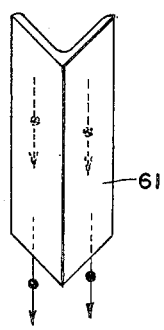
INVENTOR:
MERRILL W. MACAFEE,
BY
ATTORNEY

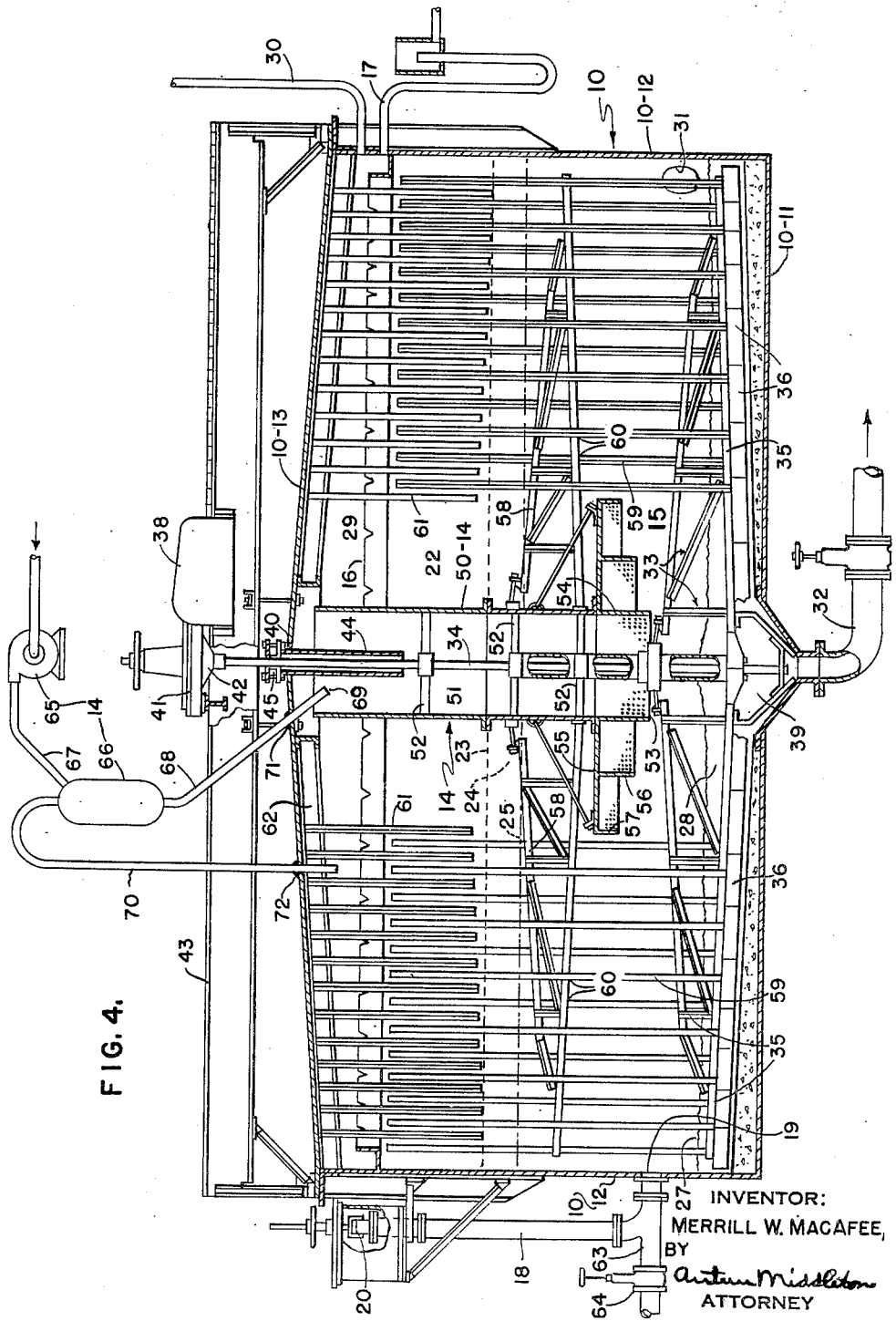

May 13, 1952  M. W. MacAFEE  2,596,575
OIL FIELD WASH TANK

Filed Oct. 22, 1949  3 Sheets-Sheet 3

INVENTOR:
MERRILL W. MACAFEE
BY
Arthur Middleton
ATTORNEY

Patented May 13, 1952

2,596,575

UNITED STATES PATENT OFFICE 2,596,575

OIL FIELD WASH TANK

Merrill W. MacAfee, Los Angeles, Calif., assignor to The Dorr Company, Stamford, Conn., a corporation of Delaware Application October 22, 1949, Serial No. 122,937

13 Claims. (Cl. 210—51)

The invention relates to the clarifying of water-bearing crude petroleum field oil. Apparatus for such general purpose is old and as used in the oil fields has employed a covered tank that is sometimes referred to as a wash tank. Such apparatus is of the continuous operating type.

In connection with what is identified herein as crude petroleum field oil, it will be understood that this includes and generally has existent therein not only crude oil providing an oil fraction, but also a water constituent providing a water fraction, inorganic solids which settle and accumulate as mud, and a quantity of entrained gases that rise as released from the oil fraction and received in the upper region of the tank.

Such continuous apparatus as heretofore employed, included feeding means by which the crude petroleum field oil is continuously passed into and distributively delivered within a lower portion of the tank for establishing and maintaining an ever-changing liquid body undergoing treatment and rising to a normal operative surface level determined as to elevation by an oil overflow weir of an oil outflow means leading from the upper interior portion of the tank, means providing a water outflow means leading from a low interior portion of the tank rising therefrom and terminating in a water overflow discharge end that approaches but does not reach an elevation as high as that of the oil overflow weir, a sediment-discharge means leading from a lowermost portion of the tank for passing mud therefrom, and a gas-conducting means leading from the upper interior portion of the tank.

As such apparatus functions, the liquids separate into a lower water stratum, an upper oil stratum embodying a content of oil of viscous type from which oil stratum gases rise into the upper interior portion of the tank, a layer of mud provided by the progressive accumulation of inorganic solids settling from water fraction and located on the tank floor, and a layer or stratum of gunk intermediate the oil and water strata and directly exposed thereto.

A troublesome feature of the process as heretofore practiced is the stratum of gunk that develops between the bottom of the oil stratum and the top of the water stratum as the operations within the tank proceed. This gunk has droplets of oil that remain and collect as emulsion. The gunk slowly but progressively increases in depth and compels arresting of the process whereby steps for withdrawal of quantities thereof can be carried out.

Gunk is a colloquial expression of common usage in the California oil fields.

The following will serve to provide a definite description for that which is referred to as "gunk" and certain characteristics thereof.

The oil pumped from the southern California wells contains a considerable amount of salty water, sand and fine bentonic type clay. Also contained in the oil itself are certain tar and wax-like compounds that segregate from the lighter oil under certain conditions.

Gunk is understood to mean a stable emulsion of oil, wax, tar, clay and salt water which accumulates between the lighter oil and heavier water layer in an oil-water separating tank generally known as an oilfield wash tank.

The heavier layer of coarser sand, tar and wax which settle below the salt water layer is called sand or residue and is different in composition.

Also according to the process as heretofore carried out, the oil stratum has been continued in a relatively undisturbed or quiescent condition, namely, in a condition that was heretofore considered favorable to the gravitation of the water from the oil stratum and to the rising of gases from the oil stratum.

The present invention has to do with the application (a) within the layer of gunk of localized gentle forward and lateral or deflective or pushing-aside forces for effecting contacting or coalescing of oil particles to form droplets that rise into the oil stratum, and (b) to the horizontal application of localized gentle forward and lateral pushing-aside forces particularly within the lower viscous oil-containing portion of the oil stratum and to the applying of reflecting forces to the forwardly and laterally displaced oil so that resulting contacting movements of water globules finally form water droplets large enough and favorable to their sinking from within the oil stratum into the underlying intermediate gunk stratum. The oil in the low portion of the oil stratum may include a viscous oil content which may tend to hold water globules so the gentle displacing and reflecting actions on the more viscous oil content are advantageously employed in obtaining the release and descent of a larger quantity of water content as settleable droplets.

Unlike in flocculation, where it is the suspended solids that are agglomerated by impulses great enough to impel them into meandering paths to maximize collisions with other suspended solids there is an oil and water mixture having substantially no solids but having two dissimilar immiscible liquids. In this invention, it is desired to agglomerate or coalesce droplets of oil on the one hand and droplets of water on the other. This is done by very gentle and limited pushing aside displacement for otherwise the water and oil will tend to emulsify which would be fatal. Thus, the displacers and reflectors of this invention are functionally unlike those used in flocculation. Upon agglomeration, further slight displacement causes these drops to find the path of vertical least resistance in the trailing edge of the displacers and reflectors whereupon the oil drops rise while the water drops sink.

In the improved form of apparatus constructed for realizing these novel features, there is employed a set of longitudinally spaced apart vertically-extending displacing members, herein referred to as displacers, supported as a set for turning about a vertically-extending axis. These displacers are V-shaped in horizontal cross-section and are arranged with the apexes foremost in their direction of horizontal turning movement about a vertical axis to leave within the trailing portions vertically-extending flow-paths of lessened resistance favorable to the upflow or rising of oil from the gunk stratum into the overlying oil stratum. This path of lessened resistance also is favorable to the descent of water particles or droplets that are formed therein. The displacers extend upwardly not only within the gunk stratum, but also reach up to a point within the oil, preferably stopping below the surface of the oil stratum, to wit, at an elevation below that of the overflow edge of the weir of the oil outflow means. Only progressive local displacing actions are primarily sought for or considered necessary in the gunk stratum. As for the overlying oil stratum there is sought for and deemed advisable not only progressive local displacing actions as effected by the displacers but also additional horizontal reflecting action therein and this additional movement within the oil stratum is attained by the employing in the construction shown of stationarily-positioned horizontally spaced-apart vertically-extending reflectors that are V-shaped in cross-section and arranged with the apexes of the V's pointing rearwardly, viz: in direction opposite to the forward path of travel of the deflectors, so that the forwardly disposed open portions of the V's of the reflectors provide vertical paths of least resistance favorable to the downward passage of water droplets into the gunk layers from the oil stratum. These paths of lessened resistance are also favorable to the ascent of oil arising from the gunk. These reflectors—as previously indicated—are preferably stationary and extend downwardly into and within the oil stratum but preferably terminate at elevation vertically spaced from the top of the water layer, or as otherwise expressed, terminate at elevation higher than that at which water is passed from the water stratum. In short, the lower ends of these reflectors may terminate at an elevation such that there is left receiving space for the gunk whereby the upper surface of the gunk need not be contacted or contacted to any great extent by the stationary reflectors as the process is practiced.

A troublesome feature encountered by prior apparatus has been the building up of mud layer of substantial depths within relatively short period of time which often required shutting down and flushing of the tank. To minimize such shut-downs, there has been introduced into the new apparatus a set of Dorr type rakes carried by a turnably driven central vertical shaft, herein referred to as a drive shaft, from the lower portions of which rake-carrying arms outwardly extend. The rake structure is turned in a forward clockwise direction and carries at the underside of said arms sets of raking blades disposed over the floor of the tank and have such inward and rearward slants as to progressively impel mud in the lower regions of the tank into a central depressed sediment-receiving section or sump from which the mud impelled thereinto is passed through suitable valve-controlled discharge means leading from the tank according to the will of an operator.

In the new form of apparatus, the drive shaft is solid but carries a cylindrical feedwell constituting the delivery portion of a feed supply. The delivery of feed is from the low end of the feedwell but is at elevation above that of the rake-carrying arm. The tubular feedwell carries at the low end thereof a circular feed spreading and distributing means. The rake-carrying arms are availed of as supports or carriers for the horizontally spaced-apart vertical displacers. There is also embodied as part of this turnable structure an upper or bracing set of outwardly-extending arms which are supported from and secured to the solid shaft through the medium of the cylindrical feedwell carried by the drive shaft. The rising displacers are connected to and braced by the bracing arms whereby a relatively rigid turnable structure is completed.

This construction constitutes a construction novel in and of itself and having a novel embodiment in the apparatus.

The preferred form of novel apparatus suitable and adaptable for performing the process and for realizing the invention hereof will now be described in conjunction with the accompanying drawings which constitute a part of this specification.

In the drawings, there is one general figure illustrative of factors and conditions typifying the prior art and the rest of the figures of said drawings collectively illustrating the new improved apparatus and are indicative of the novel steps and of improved features relating to the invention for which patentable protection is sought.

In said drawings Fig. 1 is ilustrative of the prior art.

Fig. 2 is a view of a section of a forwardly movable displacer.

Fig. 3 is a view of a section of a stationary reflector.

Figure 5:
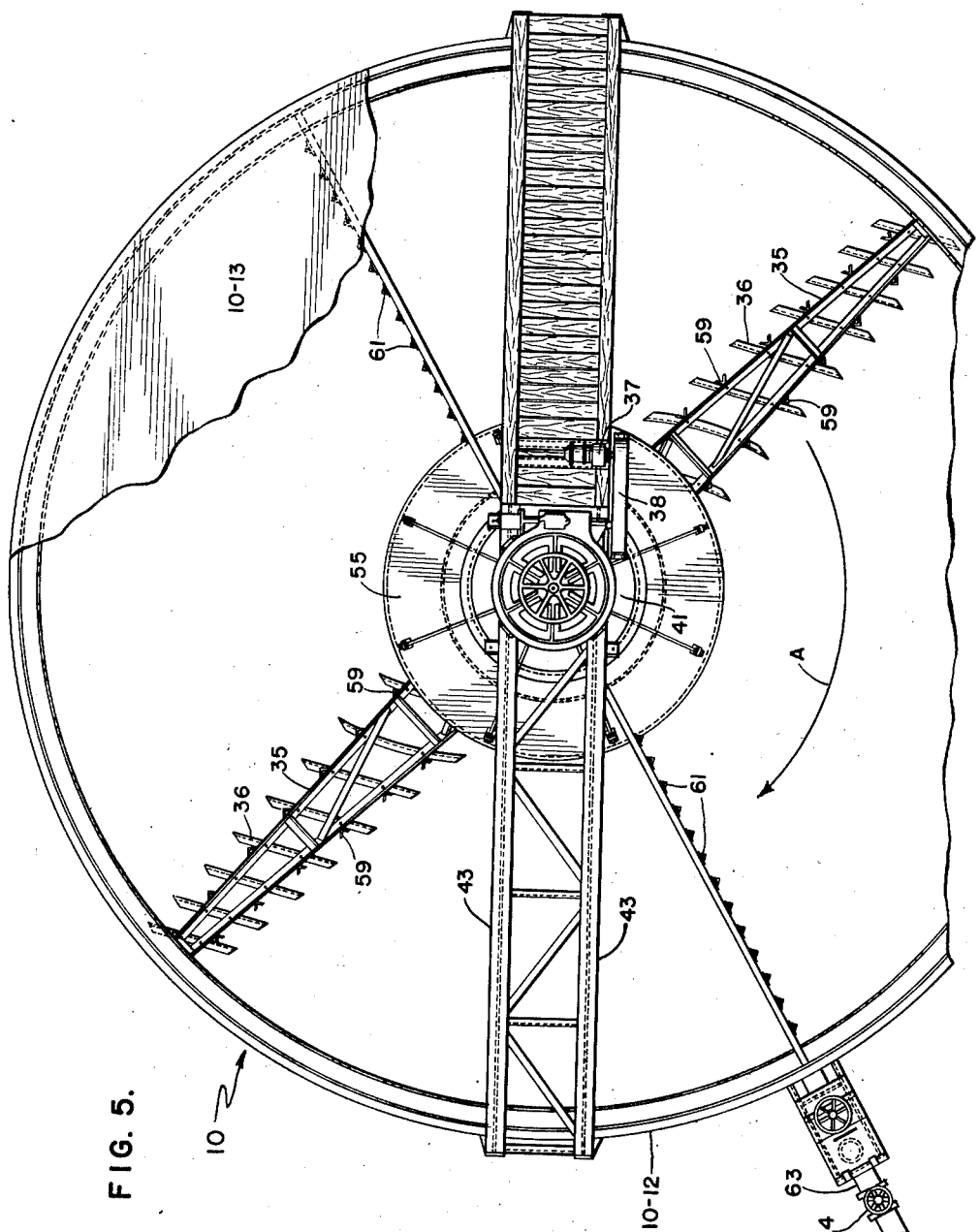

Figs. 4 and 5 respectively provide a sectional elevation and a plan view of the new apparatus. As to Fig. 4 it will be noted that the turnable rake-carrying structure thereof with rising displacer members thereupon has been moved in a clockwise direction from the position of Fig. 5 to a position whereat there is an overlapping of the forwardly movable rising displacer and the stationary reflectors.

As to the prior art illustrated by Fig. 1, it will be noted that according to the diagrammatic showing thereof the apparatus embodied a covered tank 10 having a bottom 11 with a marginal wall 12 rising therefrom and a closure top 13. A feed supply means generally designated as 14 continually supplied and delivered at 15 crude petroleum filled oil into the lower portion of the tank; an oil weir having an overflow weir edge 16 constituting part of an oil outflow means 17 leads from an upper interior portion of the tank. The overflow edge 16 determined the normal operative surface level 21 of an ever-changing liquid body which was established and maintained by the crude oil fed and delivered into the lower portion of the tank. The tank had a water outflow means 18 leading from a low interior portion 19 of the tank and thence upwardly to and finally terminating in an overflow tip 20 approaching but not reaching to elevation as high as that of the oil overflow weir edge 16. The tank also embodied a valve-controlled discharge conduit 32 serving as a mud discharge conduit.

As the prior apparatus functioned, the ever-changing body became and continued stratified providing an oil fraction constituting an overlying oil stratum 22 of which the normal surface level 21 thereof is determined by the elevation of the overflowing weir edge 16 of the oil weir, a water fraction constituting an underlying water stratum 26 of which the upper surface or face thereof is somewhat variable as to elevation and is designated by the dot and dash line 25—25; and a layer of mud designated as 28 provided by an accumulation of solids settled from the water stratum. The upper limits of this mud varies as to elevation and is designated as 27.

As the prior process proceeded, there was encountered a troublesome factor because of an intermediate layer referred to as gunk stratum 24 disposed between the lower face portion indicated by the dotted line 23—23 of the oil fraction 22 and the upper base or surface portion indicated by the dot and dash line 25—25 at the top of the water stratum 26. It will be noted that this gunk stratum 24 directly contacts the upper face of the underlying water stratum and with the lower face of the overlying oil stratum. It will also be noted that during the normal operation of such apparatus the water fraction had a surface elevation somewhat higher than that of the intake end of the water outflow pipe or as otherwise expressed, the water outflow means had an intake lower than that of the normal upper limits of the water fraction or stratum as encountered during the normal performing of the process. From the upper interior portion 29 of the tank there extends a gas conducting means generally designated 30.

*Apparatus and process according to Figs. 2 to 5 inclusive*

In the opening portion of this specification there has been indicated in a general manner novel features of construction, novel steps and operations attained thereby, and advantageous results realizable by the apparatus of these figures as compared with the construction and operation of the apparatus diagrammatically illustrated by Fig. 1. Detailed description of the apparatus of Figs. 2 to 5 and as to novel features thereof and as to the attainment of improved operative conditions and results realizable thereby is hereby set forth.

In the improved apparatus, there is employed tank 10 having a bottom 11, marginal wall 12 rising therefrom and closure top 13. The apparatus has a feed supply means generally designated as 14 which delivers incoming feed at a low locality 15 within the tank. An overflow weir edge 16 constitutes part of an oil outflow means 17 leading from the upper interior portion of the tank to the exterior thereof. The weir edge 16 determines the normal operative surface level of the ever-changing body of liquid within the tank. A water outflow means 18 leads from a low interior portion 19 of the tank and thence upwardly to and terminates in an overflow tip 20. The water column in the water outflow means 18 balances the higher head of liquid body within the tank because the upper portion of the liquid within the tank, namely, the oil of the oil stratum 22 and the gunk stratum 24 each has specific gravity less than that of water.

In the tank as the apparatus functions, there exists and continues an oil fraction or overlying stratum 22 which is indicated as having a normal surface level 21 determined as to elevation by the weir edge 16; a water fraction constitutes an underlying water stratum 26; an intermediate layer or gunk stratum 24; and sedimented solids or mud 28. A horizontal plain of surface demarcation or face contacting engagement as between the oil stratum 22 and the gunk stratum 24 is indicated by the dotted line 23—23. Between the contacting gunk stratum 24 and the underlying water stratum 26, the horizontal plane of surface demarcation or contacting engagement is indicated by the dot and dash line 25—25. The upper surface of the progressively increasing layer of mud 28 is designated as 27. The upper interior portion 29 of the tank has leading therefrom a gas-conducting means generally designated as 30. The description just given substantially parallels that given with respect to Fig. 1.

A troublesome aspect of the prior apparatus of Fig. 1 was that mud 28 built up on the bottom of the tank to a considerable depth and the removal thereof required shutting down, hosing out, and draining. This mud removal involved opening of a manhole provided as at 31 in or for the marginal wall 12, the forcibly injecting of water as through a hose nozzle projected within the tank and the draining of mud thus loosened by the hosing through a discharge conduit 32 leading from the bottom of the tank.

In the new apparatus according to Figs. 2 to 5, there has been introduced a Dorr type of sediment-making mechanism 33 that embodies a turnably supported vertically-extending shaft 34 from the lower end of which shaft there outwardly extend rake-carrying arms 35 having depending raking blades 36. The raking mechanism 33 as employed is driven from a motor 37 through the medium of a speed-reducing power-transmission mechanism 38 and functions to turn the raking mechanism in a forward clockwise direction as indicated by the arrow A whereby there is a progressive forward and inward impelling of settled solids as mud toward and into a sediment-receiving sump 39 and from which the mud is passed through a valve-controlled discharge conduit 32 leading from the tank.

In the construction shown the vertical shaft 34 is solid. The mechanism thus far described is of a construction illustrated by the Scott Patent No. 2,087,725 granted July 20, 1937, and the shaft 34 is supported and driven also according to the teachings of that patent. In the instance of the raking construction shown, the shaft 34 thereof derives support through the medium of a gear driven bull wheel 41 carried on a stationary bearing 42 supported by a beam type of structure 43 extending over the closure top 13 of the tank. The shaft extends downwardly from said stationary bearing through an aperture portion 40 of the closure top.

There are many perforations in the lower end 53 of the cylindrical feedwell 50 in the lower end of the intermediate ring 56, and in the outer ring 57. These several parts with the perforations therein constitute important factors of the feed-distributing and spreading means 54 whereby there is an early distributed delivery and release of oil particles and entrained gas which rises from the left-behind water content of the water stratum at 26 which is progressively changing.

In order to provide a sealing means between the closure top 13 and the shaft there is a downwardly-extending tubular member 44 having a gas-tight connection to the tank top and reaching to an elevation within the tank that is lower than that of the overflow weir edge 16 whereby a liquid seal is provided at and for the lower end of the tubular member because of the oil of the upper stratum 22 rising to an elevation higher than that of the lower end of the tube during the normal operation of the apparatus.

However, as further precaution against gas leakage from the interior of the tank, there is also provided a stuffing box at 45 between the upper end of the tube 44 and the shaft 33. In the construction shown it will be noted that a cylindrical feedwell 50 providing a descending feed-receiving region 51 therein surrounds the vertical shaft 34 carrying the rake arms.

At this juncture it is in order to point out that the crude petroleum field oil as supplied for treatment is delivered into the tank 10 by feed supply means generally designated as 14. In this connection see Fig. 4. The feed-supply means illustrated by this figure includes a suitable pump 65, a gas separating chamber 66, a pipe line leading from the pump into said chamber, a central feedwell 50 located within the tank 10, a descending pipe line 68 leading from the lower portion of said chamber through the tank top 13 and terminating at 69 within the feedwell 50. The chamber 66 serves as means whereby quantities of the gas embodied in the feed are separated from the liquid-solids portion of the feed. Between the upper interior portion of the chamber 66 and the upper interior portion of the tank 10 there extends a gas-transferring and pressure-equalizing conduit 70. It will be noted that the descending pipe 68 and the gas-transferring conduit 70 respectively have gas-tight welds at 71 and 72 to the surrounding portions of the cover 13 of the tank. Secured to the shaft 34 and extending outwardly therefrom are sets of horizontally-extending spacer members 52 serving as radial connecting means through the medium of which said cylindrical feedwell 50 is rigidly connected to and carried from the vertical shaft 34. This cylindrical feedwell 50 extends from an elevation higher than that of the overflow weir within the tank downwardly to a feed discharge region designated generally by 15.

This feedwell 50 is marginally perforated at its lowermost end 53 to serve as a lowermost centrally located feed-discharge and feed-distributing member of a feed distributing and spreading means 54. The feed-distributing means includes a horizontally-extending circular cap plate 55 from which depends an outer perforated ring 57 of shallow depth but perforated throughout its periphery and an intermediate ring 56 perforated throughout the lower portion of its periphery and terminating at elevation intermediate that of the low end of outer ring 57 and that of the lowermost end 53 of the feedwell.

The cylindrical feedwell 50 has connected thereto and supported therefrom an upper set of outwardly-extending arms 58 constituting bracing arms and provided for affording rigidity to the sets of horizontally spaced-apart upwardly-extending displacer members or displacers 59. These bracing arms are located at elevation higher than that of the cap plate 55 of the feed-distributing and spreading means 54. The outer ends of these bracing arms 58 are at an elevation preferably higher than that of the elevation of the intake end 19 of the water-upflow means 18.

*Displacers 59*

*Reflectors 61*

The displacers 59 are connected to the rake-carrying arms 35 and as previously indicated they are horizontally spaced-apart and are horizontally turnable about a vertically-extending axial line. They extend vertically and approach the elevation of the overflow weir 16 but terminate short of that elevation. These displacers are also connected as at 60 to the bracing arms 58 which overlie the rake-carrying arms 35 and are thus rigidly embodied in the turnable raking means that includes the rake-carrying arms 35. There are also employed in the new apparatus horizontally spaced-apart members providing stationary reflectors 61 secured to and dependingly carried from roof members 62 of the tank. These reflectors extend from an elevation higher than that of the overflow weir 16 but terminate at elevation higher than that of the intake end 19 of the water-upflow means 18, or as otherwise expressed, these reflectors 61 terminate at elevation higher than that of the bracing arms 58.

The horizontally spaced-apart displacers 59 respectively move in closed circular paths and the reflectors 61 are so spaced-apart and disposed with respect to the path of travel of the displacers whereby the latter can move through spaces between the reflectors 61 and at the same time have overlapping arrangement with the latter, to wit, whereby the upper ends of the horizontally movable displacers have overlapping position with respect to the lower portions of the stationary depending reflectors.

The displacers are generally V-shaped in cross-section and may be angle irons arranged with the apex portion of the V foremost to thus provide at the rear or trailing portion thereof hollowed out vertical flow paths of least resistance. These displacers are preferably of any shape in cross-section of which the forward face portions of the V are foremost and in which the rear or trailing portion of the displacer is recessed or shaped to provide at the rear portion thereof a hollowed out vertical flow region that provides a flow-path of lessened resistance.

The stationary reflectors are generally V-shaped in cross-section and arranged with the apex of the V pointing rearwardly so that the hollowed outer or forward portion of the reflector is disposed so as to provide a front vertical flow-path of least resistance. In other words, as to movable displacers of which the apex of the V is foremost, there is an oil upflow path of least resistance provided at the trailing portion thereof while for the stationary reflectors since the apex of the V points forwardly there is an expanding water downflow path of least resistance between the forwardly diverging legs of the V.

A part of a clockwise movable displacer 59 of V-shaped formation is illustrated in Fig. 2 with the apex of the V foremost.

A part of a stationary reflector 61 of the V-shaped formation is illustrated in Fig. 3 with the apex of the V rearmost.

In Fig. 2 the rearwardly spreading legs of the V indicate how a vertical flow-path of least resistance is provided as for rising oil particles or globules indicated by upwardly directed arrows and open circles associated therewith.

In Fig. 3 the spreading legs of the V indicate how a vertical flow-path of least resistance is provided for settling water particles or globules indicated by downwardly directed arrows and solid black circles associated therewith.

In the operation of the apparatus, the oil stratum 22 reaches up to the weir overflow edge 16 and further rising accumulation of oil in that section is avoided as the clarified or water-free oil overflows the weir edge 16 and passes from the tank. The gunk stratum 24 immediately underlies the oil stratum 22 and a typical breaking line between these two strata is indicated as to location by dot and dash line 23. The gunk stratum 24 is relatively thin or shallow as compared with the water stratum 26. The breakline as between the gunk stratum and the water stratum is indicated by the dot and dash line 25.

As the apparatus functions the operator must make sure that the outflow of water is released from the upflow conduit is so controlled that as the incoming feed is delivered in a continuous manner there is an overflow of water-free oil past the weir edge 16 and overflow of water only past the overflow tip 20 of the water-outflow means. The weir edge 16 is stationary and remains at constant elevation and the allowed outflow of water relative to the overflow of oil is regulated by the adjusting as to elevation of the water overflow tip 20.

As the process continues, the gunk stratum may become sufficiently deep to indicate that the further practical continuation of the apparatus should be discontinued and whereby at least a portion of the gunk layer should be removed. This can be accomplished, as for example, by lowering the water overflow tip to bring down the elevation of the water stratum sufficient to effect removal of some of the gunk therewith or alternately by the opening of a valve 64 in a branching discharge pipe 63 leading from a low section of the water-outflow means. Such removal of a quantity of gunk might be accomplished according to either of procedures above indicated. Moreover, the operation as a whole may be discontinued for a periodic cleaning of the troublesome mud and the apparatus of the tank. Such shut-downs would be at longer spaced periods than that experienced by the prior methods.

As to the normal operation in the preferred manner and to the advantageous performance of the continuous process carried out within the tank, it will be noted (1) that the raking mechanism 33 as employed for progressively transferring mud towards and into the sump at the lower central portion of the tank and therefrom through the valve-controlled discharge conduit 32 leading from the tank constituting one important feature of the apparatus; (2) that a major improvement within the apparatus relates to the introduction and employment of the horizontally spaced-apart displacers which are connected to the rake-carrying arms which rise vertically therefrom; (3) that the displacers rise to elevation approaching but short of that of the weir edge 16 past which water-free oil flows on its way from the tank; and (4) that the depending reflectors extend downwardly from elevation higher than the elevation of the overflow weir edge to elevation below that of the overflow weir edge but terminates at elevation above that of the intake end 19 of the water-outflow means.

In words other than above employed the lower ends of these reflectors terminate at elevation sufficiently high to permit the existence of a layer of gunk of substantial depth below them and of which the lower edge level of the layer of gunk is higher than that of the intake end of the water-outflow means. These displacers because of the V-shaped formation and vertical flow-path of lessened resistance behind them function to gently disturb or displace certain content of the gunk stratum whereby there exists the gentle and limited displacement within the gunk layer favorable to effecting a contacting and coalescing of oil particles into larger oil globules which rise from the gunk layer into the oil stratum and this rising of the oil globules may follow the path of least resistance provided by the grooved upflow portion provided at and between the rear flaring portions of the displacers. These displacers also extend a substantial distance upwardly within the oil stratum and have overlapping relationship with the depending reflectors that extend downwardly into and within the oil stratum. These displacers also effect displacement of the oil in the oil stratum and particularly of any viscous fraction in the oil stratum which may be viewed as existent in the lower part of that stratum. This limited displacement in the oil stratum as reflected by the stationary reflectors is advantageous in causing a contacting of water particles one with another and with a resultant coalescing of water particles into droplets which are heavy enough to gravitate from the oil stratum into the gunk and lower regions within the tank. In the instance of both the displacers and reflectors there exist within vertical flow-paths of lessened resistance because of the grooved forms thereof provided as between the diverging legs of the V whereby as indicated oil particles can rise and water particles or globules can gravitate along the grooved paths of lessened resistance.

Oil supplied for feed is preferably delivered through a gas-tight feeding means constructed for preventing the undue escape of gas from the upper interior portion of the tank and so as to deliver the incoming crude petroleum into the feedwell flow within which it has a gentle downflow and distributively delivered into the lower regions of the tank and which delivery in a distributed manner is facilitated by and because of the diffuser secured to and extending from the lower portion of the cylindrical well. The bracing arms are so secured to the feedwell whereby they are supported therefrom but in a manner to avoid any distortion of the cylindrical feedwell because of undue forces transmitted by the arms of the cylindrical member providing the feedwell.

I claim:

1. Field oil clarifying apparatus having a closed-top tank; field oil supply means leading into the tank and having as a part thereof a feed distributing means disposed within a low central portion of the tank but spacedly above the bottom of the tank; an oil outflow means leading from the upper interior portion of the tank and providing an oil overflow weir determining the normal surface level of an oil stratum within the tank at an elevation whereby there is left a gas-receiving space above the surface level of the oil stratum but below the top of the tank; means for releasing accumulating gases from the upper interior portion of the tank; a water outflow conduit having an intake end leading from a low interior portion of the tank and from an elevation spacedly above the bottom of the tank, said water outflow conduit providing a rising section equipped with a water overflow means outside of the tank and at elevation approaching but lower than that of the oil overflow weir; means for discharging mud from a sump-providing portion of the bottom of the tank to a region outside of the tank; centrally located vertically-extending rotatable arm-carrying means suitably supported with respect to said tank; and motivated speed-reducing and power-transmission means for turning the latter about a vertically-extending axis thereof; said apparatus being characterized in that it embodies a set of arms outwardly extending from said vertically-extending arm-carrying means, which said outwardly-extending arms are at elevation higher than that of the intake end of the water outflow conduit; in that they have connected thereto, rising therefrom and turnable therewith, horizontally spaced-apart vertically-extending displacers of which the upper ends approach but terminate at elevation lower than that of the weir edge of said oil overflow means; in that suitably but dependingly supported horizontally spaced-apart vertically-extending reflectors are employed past which the displacers repetitively move in cyclic paths, which reflectors extend downwardly from an elevation higher than that of said oil overflow weir and terminate at elevation lower than that of the uppermost ends of the displacers whereby the latter move in overlapping relationship with respect to and spacedly past the reflectors, and which downwardly-extending reflectors terminate at an elevation higher than that of the upper portion of said set of outwardly-extending arms which travel in concentric paths spacedly below the reflectors.

2. Apparatus according to claim 1 in which there is an outwardly-extending set of lowly disposed rake-carrying arms suitably supported by and drivingly connected to said motivated turnable arm-carrying means, which said set of rake-carrying arms is equipped with depending sediment raking elements functioning at elevations lower than that of the intake end of the water outflow conduit and also at elevations lower than that of the feed distributing means within the tank; said displacers also having low portions thereof connected to corresponding portions of the rake-carrying arms.

3. Apparatus according to claim 1 in which the outlying portion of the feed distributing means is at elevation higher than that of the intake end of the water outflow conduit.

4. Apparatus according to claim 1 in which the feed oil supply means has a cylindrical feedwell provided at the lower end portion with an outwardly and horizontally-extending cap plate.

5. Apparatus according to claim 4 in which the lowermost end of the cylindrical feedwell is perforated at a section thereof which is below the cap plate.

6. Apparatus according to claim 4 in which the cap plate has connected thereto and depending therefrom an outer and an intermediate ring, each of which rings is perforated throughout the marginal portion of its periphery.

7. Apparatus according to claim 1 in which the reflectors are V-shaped in horizontal cross section with the apexes thereof pointing rearward and wherein the displacers are V-shaped in horizontal cross section with the apexes thereof pointing forward.

8. A fuel oil clarifying apparatus having a closed-top tank; field oil supply means leading into the tank and having as a part thereof a feed distributing means disposed within a low central portion of the tank but spacedly above the bottom of the tank; an oil outflow means leading from the upper interior portion of the tank and providing an oil overflow weir edge determining the normal surface level of an oil stratum within the tank at an elevation whereby there is left a gas-receiving space above the surface level of the oil stratum but below the uppermost interior portion of the tank; gas-conducting means leading from within said uppermost interior portion of the tank; a water outflow conduit having an intake end leading from the low interior portion of the tank and at an elevation spacedly above the bottom of the tank, said water outflow conduit providing a rising section equipped with a positionable water overflow member located outside of the tank and disposed at an elevation approaching but lower than that of the oil overflow weir; means for discharging mud from a low sump-providing portion of the tank to a region outside of the tank; a centrally located vertically-extending rotatable rake-carrying shaft suitably supported with respect to the tank; rake-carrying arms secured to and extending outwardly from said shaft; motivated speed-reducing and power transmission means for turning said shaft and the arms carried thereby about a vertically-extending axis; sediment-engaging rakes depending from said carrying arms and functionable for progressively impelling sedimented solids from diverse sections of the bottom of the tank towards and into said sump as said rake arm-carrying shaft is turned about said axis; said apparatus being characterized in that it has horizontally spaced-apart vertically-extending displacers fixedly connected to said rake-carrying arm and rising therefrom to an elevation proximate but terminating at elevation lower than that of the weir edge of said oil overflow weir edge; in that suitably supported depending horizontally spaced-apart vertically-extending reflectors are employed past which the displacers repetitively move in circular paths as said rake arm-carrying shaft turns, which reflectors extend downwardly from an elevation higher than that of said oil overflow weir edge and terminate at an elevation spacedly higher than that of the intake end of the water outflow conduit but lower than that of the uppermost end of the displacers whereby the latter move in overlapping relationship with respect to and spacedly past the reflectors, which downwardly-extending reflectors terminate at an elevation spacedly higher than that of the upper portion of the rake-carrying arms.

9. Apparatus according to claim 8 in which there is fixedly connected to and turnable with the rake arm-carrying shaft a second set of outwardly-extending arms at elevation higher than that of the intake end of the water outflow conduit and which said second set of arms serve as bracer arms by and to which the reflectors are connected and in which the lower ends of the reflectors terminate at elevation above that of the said set of bracer arms.

10. Apparatus according to claim 8 in which the outlying portion of the feed distributing means includes a descending feedwell, a circular cap plate extending outwardly from said feedwell and depending from said cap plate at least one circular flange portion which is marginally perforated.

11. Apparatus according to claim 8 in which, as part of the feeding means, there is a downwardly-extending feedwell into which the incoming feed material is initially delivered and from the lower end of which the fed liquid is distributively delivered.

12. Apparatus according to claim 8 in which there is a vertically-extending feedwell into the upper portion of which the incoming feed is initially received and from the lower portion of which the feed is distributively delivered, which said feedwell is fixedly connected to and turnable with the rake arm-carrying shaft and to which feedwell the bracer arms referred to are connected whereby the latter derive support from the feedwell and whereby said bracer arms in turn afford support for the reflectors.

13. Apparatus according to claim 8 in which the reflectors are V-shaped in horizontal cross section with the apexes thereof pointing rearward and wherein the displacers are V-shaped in horizontal cross section with the apexes thereof pointing forward.

MERRILL W. MacAFEE.

REFERENCES CITED

The following references are of record in the file of this patent:

UNITED STATES PATENTS

| Number | Name | Date |
|---|---|---|
| 1,176,775 | Morris | Mar. 28, 1916 |
| 2,087,725 | Scott | July 20, 1937 |
| 2,259,221 | Darby et al. | Oct. 14, 1941 |
| 2,274,361 | Darby | Feb. 24, 1942 |
| 2,322,720 | Scott et al. | June 22, 1943 |
| 2,338,986 | Waterman | Jan. 11, 1944 |